United States Patent
Kitamura et al.

(10) Patent No.: US 6,174,089 B1
(45) Date of Patent: Jan. 16, 2001

(54) ROLLING BEARING HAVING ROLLING ELEMENTS WHOSE MAJOR COMPONENT IS ZIRCONIA

(75) Inventors: Kazuhisa Kitamura, Kashihara; Hiroaki Takebayashi, Yao; Tomoya Hattori, Kashiwara, all of (JP)

(73) Assignee: Koyo Seiko Co., Ltd., Osaka (JP)

( * ) Notice: Under 35 U.S.C. 154(b), the term of this patent shall be extended for 0 days.

(21) Appl. No.: 09/244,029

(22) Filed: Feb. 4, 1999

(30) Foreign Application Priority Data

Feb. 5, 1998 (JP) .................................................. 10-024421

(51) Int. Cl.[7] .................................................... F16C 33/32
(52) U.S. Cl. .............................................................. 384/492
(58) Field of Search .................................... 384/492, 913, 384/907.1

(56) References Cited

U.S. PATENT DOCUMENTS

| | | | |
|---|---|---|---|
| 3,999,998 | * 12/1976 | Carbonnel et al. | 106/64 |
| 5,648,303 | * 7/1997 | Nakamura | 501/87 |
| 5,967,670 | * 10/1999 | Gabelli et al. | 384/492 |
| 5,971,620 | * 10/1999 | Gabelli et al. | 384/491 |

FOREIGN PATENT DOCUMENTS 4-243960    9/1992 (JP) .
411223220 * 8/1999 (JP) .

OTHER PUBLICATIONS

"Ceramic Materials Physical, Mechanical, Thermal And Electrical Properties Reference Chart", By Ferro–Ceramic Grinding Inc., http://ferroceramic.com/tables/t_17.htm., Apr. 2000.*

Young's Modulus, Flexural Strength And Fracture Of Yttria– Stabilized Zirconia Versus Temperature, Adams et al., Journal Of American Ceramic Society, vol. 80, Apr. 1997.*

"Advanced Ceramics Get Tough On Costs", Materials Engineering, pp. 20–22, ISSN 0025–5319, Apr. 1992.*

* cited by examiner

Primary Examiner—Charles A. Marmor
Assistant Examiner—Roger Pang
(74) Attorney, Agent, or Firm—Wenderoth, Lind & Ponack, L.L.P.

(57) ABSTRACT

There is provided a rolling bearing which is capable of reducing vibrations and noise while satisfying requirements of high-speed rotation and prolonged life of grease. Balls are formed of a ceramic material whose major component is zirconia and which has a Young's modulus of 250 GPa or lower. The zirconia content of the ceramic material is not less than 80 wt %. The ceramic material is sintered by HIP. The balls are low in Young's modulus, allowing the contact surface pressure between rolling element and raceway to be lowered, so that the bearing can be reduced in vibrations and noise. Also, the bearing is high in durability because of HIP sintering.

5 Claims, 4 Drawing Sheets

| | Test time, hour |
|---|---|
| | 100  200  300  400 |
| (Invention) HIP zirconia | ○○○ |
| Non-HIP zirconia | ×× ×——× } Peeling |

ROLLING BEARING HAVING ROLLING ELEMENTS WHOSE MAJOR COMPONENT IS ZIRCONIA

BACKGROUND OF THE INVENTION

The present invention relates to rolling bearings, for example, a rolling bearing suitable for use with spindles of hard disk drives (HDDs), small-sized spindles for dental handpieces and the like.

Conventionally, as this type of rolling bearing, there has been available a rolling bearing comprising inner and outer rings made of bearing steel, and balls made of silicon nitride. Because the balls are made of silicon nitride, this bearing is advantageous in being capable of high-speed rotation and free from replenishment of grease for a long time.

However, in the conventional bearing as described above, although the intervals for replenishment of grease during high-speed rotation can be prolonged, that is, prolonged life of grease can be achieved, there has been a problem that increased vibrations and noise would be involved, as compared with bearings made fully of bearing steel, because the contact surface pressure between bearing steel and silicon nitride is higher than the contact surface pressure of bearings in which the inner and outer rings and the balls are both made of bearing steel.

SUMMARY OF THE INVENTION

Therefore, an object of the present invention is to provide a rolling bearing which is capable of reducing vibrations and noise while satisfying the requirements of high-speed rotation and prolonged life of grease.

In order to achieve the above object, the present invention provides raceway rings, and rolling elements which are formed of a ceramic material whose major component is zirconia and which has a Young's modulus not more than 250 GPa.

According to this invention, the rolling elements are formed of the ceramic material whose major component is zirconia and which has a Young's modulus of 250 GPa or lower. Therefore, because of the low Young's modulus of the rolling element, the contact surface pressure between the rolling elements and the raceway rings becomes lower. As a result, this rolling bearing can be greatly reduced in vibrations and noise. Consequently, the rolling bearing has advantages of low vibrations and low noise in addition to the capability of high-speed rotation and prolonged life of grease.

In an embodiment, the ceramic material of the rolling elements is sintered by hot isostatic pressing (hereinafter, abbreviated as HIP).

In this embodiment, the rolling elements made of a ceramic material whose major component is zirconia are sintered by HIP, and this results in a compact sintered body having almost no pores. Accordingly, by using these rolling elements, the rolling bearing becomes small in vibrations, low in noise and yet good at durability (high in fatigue strength)

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinbelow, the present invention is described in more detail by an embodiment illustrated in the accompanying drawings.

Figure 1:
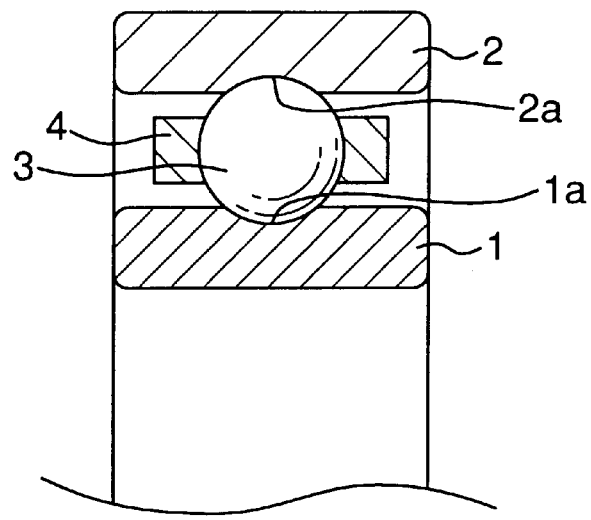
FIG. 1 is a sectional view of a radial ball bearing which is one embodiment of the present invention.

FIG. 1 is a sectional view showing a radial ball bearing which is one example of the rolling bearing of the present invention. This radial ball bearing comprises an inner ring 1 having a raceway 1a, an outer ring 2 having a raceway 2a, a plurality of balls 3 as rolling elements arranged between the raceways 1a and 2a, and a cage 4 for holding the plurality of balls 3 with equal intervals circumferentially.

The inner ring 1, the outer ring 2 and the cage 4 are made of bearing steel, and the balls 3 are formed of a ceramic material whose major component is zirconia and which has a Young's modulus of not more than 250 GPa. This ceramic material may be one obtained by adding rare earth oxides as a stabilizer to zirconia within a range of less than 10 wt % and then sintering them, or a composite ceramic material which has a content of zirconia, the major constituent, of 80 wt % to 100 wt % and a content of alumina of 20 wt % to 0 wt %. Also, although this composite ceramic material may be so constituted that only the major constituents composed of zirconia and alumina attain to 100 wt %, yet components serving as sintering additives for accelerating the sintering process or components for suppressing grain growth may be added as minute components. The sintering additives may be selected from among various types of rare earth oxides, magnesium oxide, calcium oxide or the like.

The balls 3 made of this ceramic material can be fabricated by the following process as an example.

First, zirconia powder and alumina powder are weighed within the aforementioned ranges so as to result in a specified ratio, and mixed by a ball mill by usual process (where sintering additives or the like may be added). Then, after drying, the mixed powder is molded into a spherical shape by die pressing, and heated in a vacuum or an inert gas atmosphere, thus sintered by normal pressure. Next, the sintered body is HIP sintered by using an inert gas such as argon gas or nitride gas. The temperature for HIP sintering is normally set to a temperature about 50° C. lower than the temperature for the normal-pressure sintering. The sintered body obtained in this way results in one having no 3 μm or larger pores, a compact body having virtually no pores. Thus, by grinding the surface of the resulting sintered body, balls 3 having a very smooth surface can be obtained.

By the above-described fabrication process, the present inventors fabricated balls 3 of Sample Nos. 1 to 5 which were changed in the constituent ratio of zirconia to alumina in the composite ceramic material. Table 1 shows measurement results of Young's modulus on these samples:

TABLE 1

| Sample No. | Alumina | Zirconia | Young's modulus |
| --- | --- | --- | --- |
| No. 1 | 0 wt % | 100 wt % | 220 GPa |
| No. 2 | 20 wt % | 80 wt % | 250 GPa |
| No. 3 | 40 wt % | 60 wt % | 280 GPa |
| No. 4 | 60 wt % | 40 wt % | 310 GPa |
| No. 5 | 80 wt % | 20 wt % | 340 GPa |

Sample Nos. 3 to 5 are comparative examples, and Sample No. 1 and Sample No. 2 are examples of the present invention. As a result of this experiment, it was found that increasing the zirconia content causes Young's modulus to decrease, where Young's modulus is 250 GPa or lower in samples with 80 wt % or higher contents of zirconia, and 280 or higher in samples with 60 wt % or lower contents of zirconia.

Figure 2:
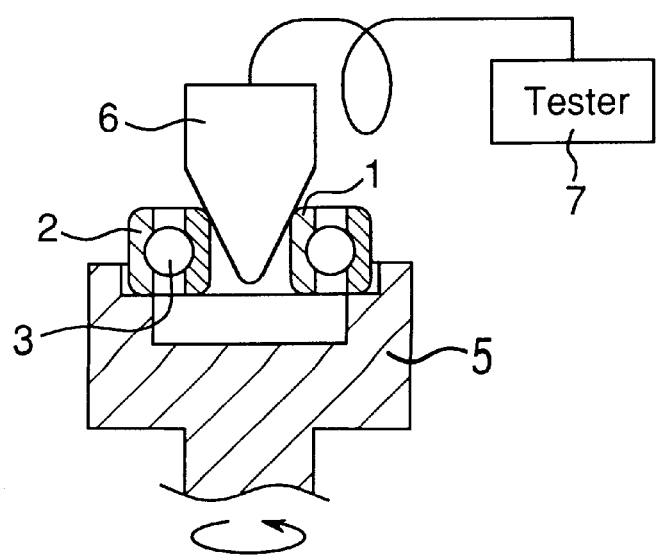
FIG. 2 is a view showing a measuring instrument for axial vibrations.
Figure 3:
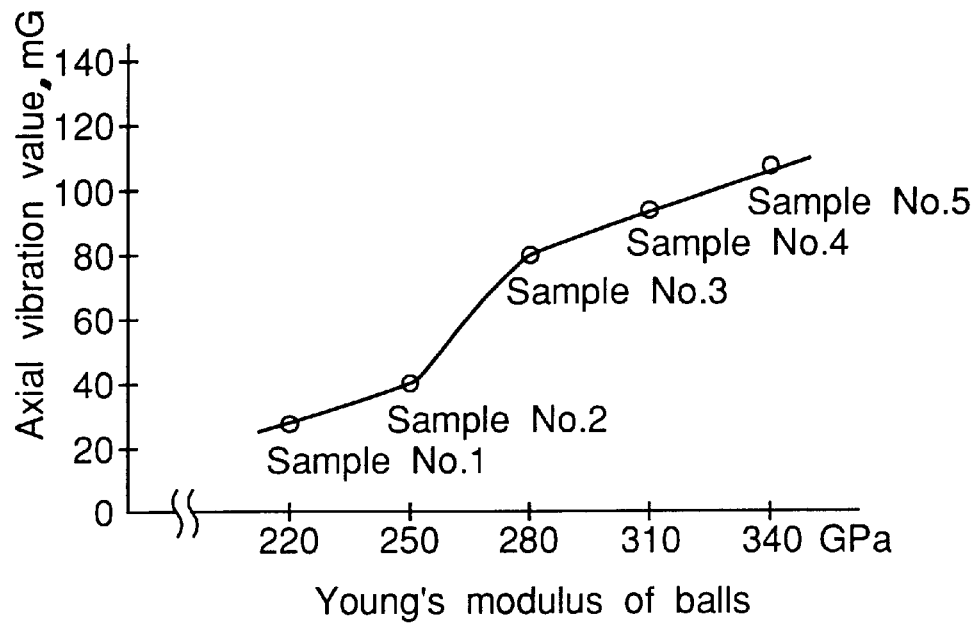
FIG. 3 is a chart showing experimental results of researching the relationship between Young's modulus of the rolling element and axial vibration value.

Then, with respect to radial ball bearings formed by using the balls 3 made in the above experiment, axial vibration value was measured with a measuring instrument shown in FIG. 2. In this measuring instrument, with the outer ring 2 mounted on a rotating base 5 that rotates at a specified running speed (1800 r.p.m.), axial vibrations are detected by an acceleration pickup 6 fitted into the inner ring 1, and vibration value is measured by a vibration acceleration tester 7. The result is that the axial vibration value increases with increasing Young's modulus of the balls 3 as shown in FIG. 3. Besides, it was found that the axial vibration value abruptly increases between Sample No. 2 having a Young's modulus of 250 GPa and Sample No. 3 having a Young's modulus of 280 GPa. Therefore, using the balls 3 made of a ceramic material whose major component is zirconia having a Young's modulus of 250 GPa or lower makes it possible to reduce the axial vibration value.

Figure 4:
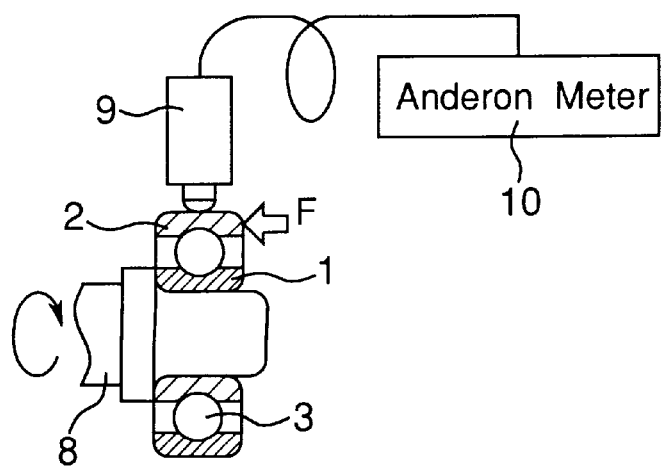
FIG. 4 is a view showing an Anderon value measuring instrument.
Figure 5A:
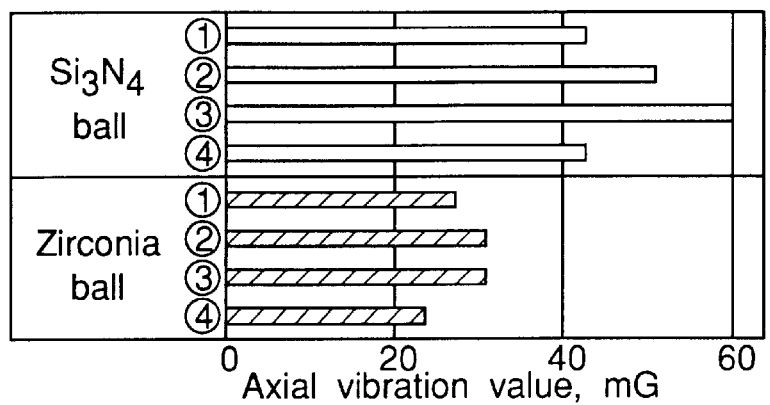
FIGS. 5A to 5D are charts showing test results of Anderon values on balls made of silicon nitride and balls made of zirconia.
Figure 5B:
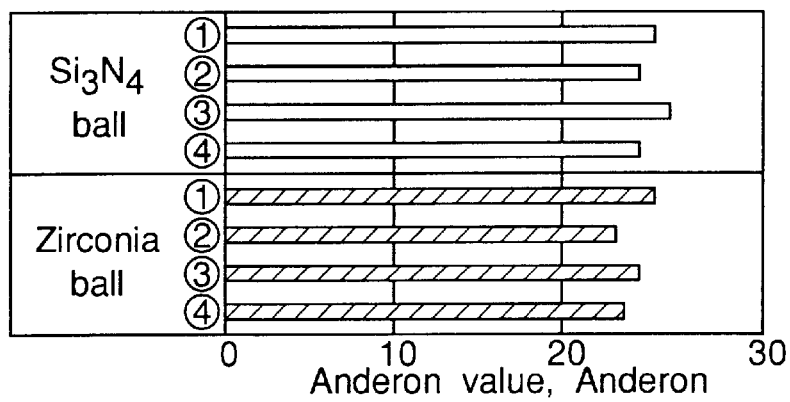
Figure 5C:
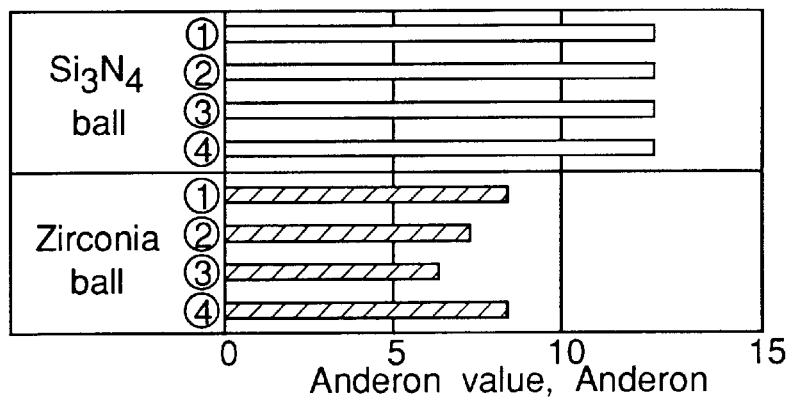
Figure 5D:
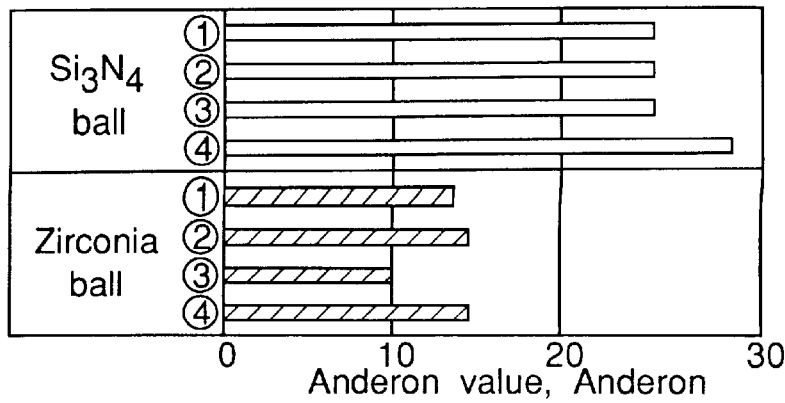

Also, the axial vibration value was measured under the condition that conventional balls made of silicon nitride and the balls 3 formed of a ceramic material whose major component is zirconia in this embodiment were interchangeably incorporated between the same four sets of inner and outer rings 1, 2. Further, radial vibrations of radial ball bearings were measured with an Anderon-value meter as shown in FIG. 4. In this measuring instrument, with the inner ring 1 mounted on a rotating shaft 8 that rotates at a specified running speed, a velocity pickup 9 is brought into contact with an outer peripheral face of the outer ring 2 while applying a load F axially, and the radial vibration velocity of the outer ring 2 is detected, by which the Anderon value is measured by an Anderon meter 10. Results of this are shown in FIGS. 5A to 5D. As shown in FIG. 5A, the balls 3 made of zirconia in this embodiment have about one half the axial vibration value of the conventional balls made of silicon nitride ($Si_3N_4$). Also, as shown in FIG. 5B, there is almost no difference in the Anderon value (Anderon L) at low frequencies (50 Hz to 300 Hz) between the balls made of silicon nitride and the balls 3 made of zirconia. However, as shown in FIG. 5C, the Anderon value (Anderon M) at medium frequencies (300 Hz to 1800 Hz) can be reduced to about two thirds. Further, as shown in FIG. 5D, the Anderon value (Anderon H) at high frequencies (1800 Hz to 10000 Hz) can be reduced to one half.

Sounds that man's ears feel are noise caused by vibrations in the aforementioned medium frequencies and high frequencies. Therefore, a radial ball bearing using the balls 3 made of a ceramic material whose major component is zirconia according to this embodiment is capable of greatly reducing harsh noise.

Figures 6, 7:
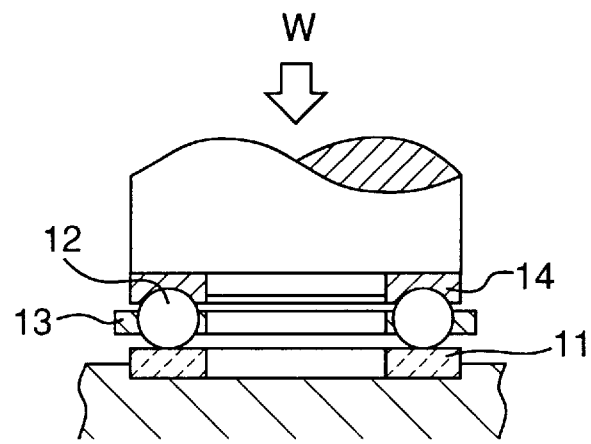
FIG. 6 is a view showing test equipment for performing a fatigue test of the rolling elements.
FIG. 7 is a chart showing test results of rolling life on non-HIP zirconia and HIP zirconia.

Further, with test equipment shown in FIG. 6, a rolling performance evaluation test was performed in spindle oil on HIP sintered zirconia (hereinafter, referred to as HIP zirconia) and normal-pressure sintered zirconia (hereinafter, referred to as non-HIP zirconia). In this test, three balls 12 made of bearing steel (SUJ 2) are rolled on a flat-plate test piece (sample) 11 made by molding zirconia into a flat plate and sintering it, while equal intervals are held by a cage 13. Then, the balls 12 are rotated at 1200 r.p.m. by applying a specified load W via a raceway 14, and rolling fatigue of the test piece 11 is evaluated.

For a comparison of rolling life between HIP zirconia and non-HIP zirconia, a rolling life test involving long-time rotation with a specified load applied was performed. The result of this test is that, as shown in FIG. 7, the non-HIP zirconia yielded peeling damage in less than 100 hours, while the HIP zirconia showed no damage even in 400 hours. A reason for this could be that the HIP zirconia is a compact sintered body without pores.

Therefore, the radial ball bearing having the balls 3 made of HIP zirconia has an advantage of long life in addition to low vibrations and low noise.

The above description has been made on an embodiment which uses the inner and outer rings 1, 2 and cage 4 made of bearing steel and the balls 3 are formed of a ceramic material whose major component is HIP zirconia and which has a Young's modulus of 250 GPa or lower. However, the material for the inner and outer rings 1, 2 and cage 4 is not limited to bearing steel, and maybe selected from among various materials. For example, it is needless to say that the material may be stainless steel or various types of ceramic materials having a Young's modulus of 250 GPa or lower.

Further, in the above embodiment, the whole ball 3 is formed of a ceramic material whose major component is 250 GPa or lower zirconia. Otherwise, it is also possible that only the surface part of the ball may be formed of a ceramic material whose major component is zirconia and which has a Young's modulus of 250 GPa or lower, while the other part is formed of a ceramic material which has a Young's modulus of 250 GPa or higher and whose major component is zirconia or a ceramic material made of other components, or metal.

In addition, although the above description has been made on a radial ball bearing, the present invention of course may also be applied to all the types of rolling bearings such as thrust ball bearings and roller bearings.

As apparent from the above description, since the rolling bearing of the present invention comprises the rolling elements in which at least their surface parts making contact with the raceways are formed of a ceramic material which has a Young's modulus of 250 GPa or lower and whose major component is zirconia, the rolling bearing is capable of attaining high-speed rotation and prolonged life of grease and moreover of reducing vibrations and noise by lowering the contact surface pressure between the rolling elements and the raceways.

In the rolling bearing of the embodiment, because the ceramic material of the rolling elements is an HIP sintered ceramic material, there are virtually no open pores so that a rolling bearing superior in load resistance and long in life can be obtained.

The invention being thus described, it will be obvious that the same may be varied in many ways. Such variations are not to be regarded as a departure from the sprit and scope of the invention, and all such modifications as would be obvious to one skilled in the art are intended to be included within the scope of the following claims.

What is claimed is:

1. A rolling bearing for a HDD spindle comprising:

raceway rings, and rolling elements which are formed of a ceramic material and which has a Young's modulus of not more than 250 GPa, wherein the ceramic material of the rolling elements is sintered by hot isostatic pressing, the rolling elements are formed by sintering a composite ceramic material which has a content of zirconia of not less than 80 wt %, and all of the sintered rolling elements have no pores of not less than 3 $\mu$m, whereby vibrations and noises are reduced.

2. The rolling bearing according to claim 1, wherein the raceway rings are formed of a bearing steel.

3. The rolling bearing according to claim 1, wherein the raceway rings are formed of a stainless steel.

4. The rolling bearing according to claim 1, wherein the raceway rings are formed of a ceramic material.

5. A rolling bearing comprising:

raceway rings formed of a stainless steel, and rolling elements which are formed of a ceramic material containing not less than 80 wt % zirconia and which has a Young's modulus of not more than 250 GPa.

* * * * *